United States Patent [19]

Jung

[11] Patent Number: 5,699,122
[45] Date of Patent: Dec. 16, 1997

[54] METHOD AND APPARATUS FOR ENCODING A VIDEO SIGNAL BY USING A MODIFIED BLOCK TRUNCATION CODING METHOD

[75] Inventor: Hae-Mook Jung, Seoul, Rep. of Korea

[73] Assignee: Daewoo Electronics, Co., Ltd., Seoul, Rep. of Korea

[21] Appl. No.: 617,587

[22] Filed: Mar. 19, 1996

[30] Foreign Application Priority Data

Mar. 28, 1995 [KR] Rep. of Korea ............... 95-6620

[51] Int. Cl.$^6$ ...................................... H04N 7/12
[52] U.S. Cl. .................. 348/420; 382/237; 382/299
[58] Field of Search ........................... 348/384, 390, 348/392, 399, 408, 420, 424, 425; 382/299, 272, 237; 358/432, 433, 261.3, 426, 451, 457

[56] References Cited

U.S. PATENT DOCUMENTS

| | | | |
|---|---|---|---|
| 4,742,553 | 5/1988 | Irwin | 382/299 |
| 5,029,228 | 7/1991 | Nonoyama et al. | 382/299 |
| 5,416,606 | 5/1995 | Katayama et al. | 358/432 |

*Primary Examiner*—Amelia Au
*Attorney, Agent, or Firm*—Pennie & Edmonds, LLP

[57] ABSTRACT

A video signal is encoded to provide a coded video signal, wherein a frame of the video signal is divided into a multiplicity of nonoverlapping blocks and each of the blocks contains K×L pixels, K and L being positive integers, by the steps of: dividing K×L pixels included in a block into a bright group and a dark group based on intensity values of the pixels; deciding a bit plane which contains K×L binary pixels, each of the binary pixels denoting either the bright or the dark group where a corresponding pixel in the block belongs to; dividing the bit plane to N subblocks each of which contains M binary pixels; deciding N majority values each of which represents a more frequently occurring binary pixel value for each of the N subblocks, and for providing a modified bit plane which contains the N majority values as its N binary pixel values; providing a restored bit plane which consists of N subblocks each of which contains M binary pixels having a value corresponds to one of the N majority values; determining a sample mean and a sample variance of the block; determining two reconstruction values which denote a representative intensity value of the pixels included in the bright or the dark group; and combining the two reconstruction values, and the modified bit plane, to thereby provide a block of the coded video signal.

16 Claims, 4 Drawing Sheets

FIG. 1A
(PRIOR ART)

| $f_1$ | $f_2$ | $f_3$ | $f_4$ |
|---|---|---|---|
| $f_5$ | $f_6$ | $f_7$ | $f_8$ |
| $f_9$ | $f_{10}$ | $f_{11}$ | $f_{12}$ |
| $f_{13}$ | $f_{14}$ | $f_{15}$ | $f_{16}$ |

FIG. 1B
(PRIOR ART)

| A | A | A | B |
|---|---|---|---|
| A | A | A | B |
| A | A | B | B |
| B | B | B | B |

FIG. 1C
(PRIOR ART)

| 0 | 0 | 0 | 1 |
|---|---|---|---|
| 0 | 0 | 0 | 1 |
| 0 | 0 | 1 | 1 |
| 1 | 1 | 1 | 1 |

FIG.2A

| $f_1$ | $f_2$ | $f_3$ | $f_4$ | $f_5$ | $f_6$ |
|---|---|---|---|---|---|
| $f_7$ | $f_8$ | $f_9$ | $f_{10}$ | $f_{11}$ | $f_{12}$ |
| $f_{13}$ | $f_{14}$ | $f_{15}$ | $f_{16}$ | $f_{17}$ | $f_{18}$ |
| $f_{19}$ | $f_{20}$ | $f_{21}$ | $f_{22}$ | $f_{23}$ | $f_{24}$ |

FIG.2B

| 0 | 1 | 1 | 1 | 0 | 0 |
|---|---|---|---|---|---|
| 0 | 0 | 1 | 0 | 1 | 0 |
| 1 | 1 | 1 | 1 | 1 | 0 |
| 0 | 1 | 1 | 0 | 0 | 0 |

METHOD AND APPARATUS FOR ENCODING A VIDEO SIGNAL BY USING A MODIFIED BLOCK TRUNCATION CODING METHOD

FIELD OF THE INVENTION

The invention relates to a video signal encoding apparatus; and, more particularly, to a method and an apparatus for encoding a video signal by using a modified Block Truncation Coding ("BTC") method.

DESCRIPTION OF THE PRIOR ART

In various electronic applications such as high definition TV and video telephone systems, a video signal may be transmitted in a digital form. When the video signal comprising a sequence of video "frames" is expressed in a digital form, there occurs a substantial amount of digital data: for each line of a video frame is defined by a sequence of digital data elements referred to as "pixels". Since, however, the available frequency bandwidth of a conventional transmission channel is limited, in order to transmit the substantial amount of digital data through the fixed channel, a video signal encoding method is normally used to compress the digital data.

A BTC method is one of such video signal compression techniques, which greatly reduces the amount of digital data while maintaining the picture quality.

To encode a video signal by using the BTC method, a frame of video signal is divided into non-overlapping blocks of a size K×K, K being a positive integer. Referring to FIG. 1A, there is shown exemplary block which may serve as a unit of encoding in the BTC method. The block shown in FIG. 1A includes 16 pixels each of which is represented by one of symbols $f_1$ to $f_{16}$.

The N(=$K^2$) pixels in a block are further divided into two groups (a bright and a dark groups) and the intensity value of each pixel included in the block is then converted into one of two reconstruction values each of which denotes a representative intensity value of the pixels included in the bright or the dark group, respectively. In FIG. 1B, A and B are the reconstruction values, A representing the dark group and B the bright group. Consequently, the block is expressed by the two reconstruction values and a pattern denoting the representation of each of the pixels in the block by one of the two reconstruction values. The pattern is expressed by a bit plane, i.e., a block of binary images such as the one shown in FIG. 1C.

The two reconstruction values are determined from a sample mean and a sample variance which characterize the brightness and the contrast of the block, respectively. The sample mean $f_M$ and the sample variance $f_v^2$ of the intensity values of the pixels included in the block shown in FIG. 1A may be calculated as follows:

$$f_M = \frac{1}{N} \sum_{i=1}^{N} f_i \qquad \text{Eq. 1}$$

$$f_v = \sqrt{\frac{1}{N} \sum_{i=1}^{N} (f_i^2 - f_M^2)} \qquad \text{Eq. 2}$$

wherein N represents the number of pixels contained in the block; i denotes an integer ranging from 1 to N; and $f_i$ is an intensity value of a pixel denoted with the same symbol in FIG. 1A.

The two reconstruction values are decided so that a sample mean and a sample variance for the two-tone block shown in FIG. 1B are the same as those of the original block shown in FIG. 1A, respectively. To achieve this, the two reconstruction values, i.e., A and B, are determined as follows:

$$A = f_M - f_v \sqrt{\frac{L}{N-L}} \qquad \text{Eq. 3}$$

$$B = f_M + f_v \sqrt{\frac{N-L}{L}}$$

wherein L represents the number of pixels whose intensity values are greater than or equal to the sample mean $f_M$.

Referring back to FIG. 1B, pixels whose intensity values are less than $f_M$ are represented by A's while the others are represented by B's. On the other hand, in the bit plane shown in FIG. 1C, pixels whose intensity values are smaller than $f_M$ are represented by 0's while the others are represented by 1's.

The two reconstruction values and the bit plane determined at an encoder are transmitted to a corresponding decoder wherein the bit plane indicates whether each pixel in the block belongs to the bright group or the dark group and each of the two reconstruction values represents reconstructed pixel values in each group, respectively, at the decoder.

By representing a block of video signal by two reconstruction values and a bit plane, the amount of data to be transmitted on a channel can therefore be greatly reduced.

At the corresponding decoder, the bit plane as well as the two reconstruction values are decoded into a block of a reconstructed video signal. There may exist a nontrivial difference between the original and the reconstructed video signals, because as many as K×K different pixel intensity values are represented by only two reconstruction values. However, since the sample mean and the sample variance for each of the blocks are preserved throughout the whole BTC process, the brightness, the contrast and the most visible features within each block are as well preserved. In the absence of a large grey-level variation within a block, the smaller variations are retained. This will closely match the human visual system's response in that large variations tend to mask smaller variations within their vicinities. Therefore, the reconstructed video signal can be a good approximation to the original signal despite the large reduction in the number of bits made during the BTC process.

Meanwhile, if every binary pixel included in a bit plane is transmitted without further processing, as many as K×K bits are required to represent the bit plane. Therefore, the number of bits used in encoding a frame of video signal is the same as the number of pixels in the frame added by the number of bits consumed in encoding the reconstruction values for each of the blocks. Although the number of bits to be transmitted is reduced by using the conventional BTC method, a large number of bits are still used in transmitting the bit plane. Since, in the conventional BTC scheme described above, the bit plane is not further processed for data compression, by processing the binary pixels contained in the bit plane, a more reduction of bits in encoding the video signal can be achieved.

SUMMARY OF THE INVENTION

It is, therefore, a primary object of the invention to provide a method and an apparatus, for use in an encoder which encodes a video signal by using a BTC method, for reducing the number of bits used in representing bit planes.

In accordance with the present invention, there is provided an apparatus for encoding a video signal to provide a coded video signal, wherein the video signal includes a plurality of frames, each of the frames is divided into a multiplicity of non-overlapping blocks and each of the blocks contains K×L pixels, K and L being positive integers, said apparatus comprising:

means for dividing K×L pixels included in each block into a bright group and a dark group based on intensity values of the pixels;

means, for said each block, for deciding a bit plane which contains K×L binary pixels, each of the binary pixels denoting either the bright or the dark group where a corresponding pixel in said each block belongs to;

means, for said each block, for dividing the bit plane to N subblocks each of which contains M binary pixels, M and N being positive integers;

means, for said each block, for deciding N majority values each of the N majority values representing a more frequently occurring binary pixel value for each of the N subblocks, and for providing a modified bit plane which contains the N majority values as its N binary pixel values;

means, for said each block, for providing a restored bit plane in response to the modified bit plane wherein the restored bit plane consists of N subblocks each of which contains M binary pixels, said M binary pixels having a value corresponding to one of the N majority values;

means for determining a sample mean and a sample variance of the K×L pixels included in said each block;

means, for said each block, for determining two reconstruction values, in response to the restored bit plane, the sample mean and the sample variance, wherein each of the reconstruction values denotes a representative intensity value of the pixels included in the bright or the dark group; and means, for said each block, for combining the two reconstruction values and the modified bit plane, to thereby provide the coded video signal.

BRIEF DESCRIPTION OF THE DRAWINGS

The above and other objects and features of the present invention will become apparent from the following description of preferred embodiments given in conjunction with the accompanying drawings, in which:

FIGS. 1A to 1C exemplify a block of video signal and its corresponding two-tone block and bit plane used in the conventional BTC method;

FIGS. 2A to 2B illustrate a block of video signal and its corresponding bit plane used in the modified BTC method in accordance with the present invention;

DETAILED DESCRIPTION OF THE PREFERRED EMBODIMENTS

Referring to FIG. 2A, there is shown an exemplary block which is a unit of encoding in a modified BTC method in accordance with the present invention. To encode a video signal by using the modified BTC method, a frame of the video signal is first divided into nonoverlapping blocks of a size K×L, K and L being positive integers. The block shown in FIG. 2A includes 6×4 pixels each of which is represented by one of symbols $f_1$ to $f_{24}$.

The 6×4 pixel block is processed to provide a bit plane similar to the one shown in FIG. 2B. Specifically, the 6×4 pixels in the block are further divided into two groups (a bright and a dark groups) by using a threshold. Then the bit plane is formed wherein each of the 24 binary pixels in the bit plane represents either the bright or the dark group where a corresponding pixel in the block belongs to. That is, a pixel whose value is larger than the threshold (i.e., a pixel included in the bright group) corresponds to a binary pixel having a value 1 in the bit plane and a pixel whose value is smaller than the threshold (i.e., a pixel included in the dark group) corresponds to a binary pixel having a value 0 in the bit plane. Usually, a sample mean $f_M$ of the block is used as the threshold, which results in a same bit plane with the conventional BTC method, wherein the sample mean $f_M$ of the block shown in FIG. 2A may be calculated as follows:

$$f_M = \frac{1}{24} \sum_{i=1}^{24} f_i \qquad \text{Eq. 4}$$

Figure 3A:
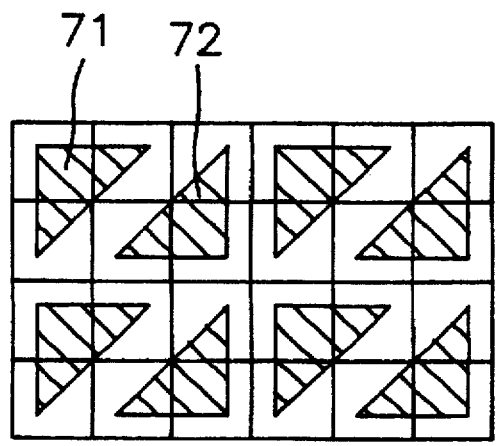
FIGS. 3A to 3C offer diagrams for explaining a bit plane coding method of the present invention employing triangular subblocks and a modified bit plane.

Unlike the conventional BTC method, the bit plane is processed to provide a simpler one, which compresses the data to be transmitted further in the present invention. To do this, the 6×4 binary pixels in the bit plane shown in FIG. 2B are first divided into subblocks of, e.g., a triangular shape, as shown in FIG. 3A, each subblock having 3 neighboring pixels. For instance, binary pixels corresponding to the pixels $f_1$, $f_2$ and $f_7$ shown in FIG. 2A are included in a subblock 71 shown in FIG. 3A.

Figure 3B:
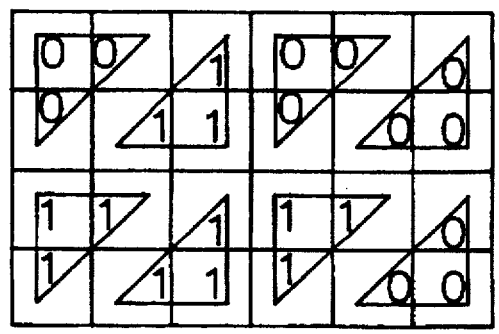

Then, a majority value is determined for binary pixels included in each subblock, wherein a majority value is either binary value 0 or 1 depending on which occurs more frequently than the other one among the binary pixel values of said each subblock. For example, for the subblock 71, the majority value is 0 because two of the 3 binary pixels included therein have 0 value. By counting the number of 0's and 1's in a subblock, the majority value for the subblock is easily determined. The majority values derived from the bit plane shown in FIG. 2B are provided in FIG. 3B, wherein all binary pixel values in a subblock are replaced by the majority value for the subblock.

Figure 3C:
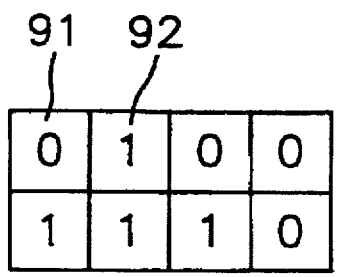

In accordance with the present invention, therefore, a majority value is used to represent each of the subblocks in a modified bit plane, to thereby reduce the number of bits or the size of bandwidth used in transmitting the bit plane data. By representing 3 binary pixels with one majority value, the bit plane shown in FIG. 2B can be converted to the modified bit plane shown in FIG. 3C, wherein binary pixels 91 and 92 correspond to subblocks 71 and 72, respectively. It is noted that 8 binary pixels of the modified bit plane are used in representing 24 binary pixels of the original bit plane, entailing substantial reduction in the number of bits used to encode the bit plane.

In encoding the block of the video signal by using the modified BTC method, two reconstruction values are also to be determined in accordance with the modified bit plane pixel data instead of the original bit plane data. Specifically, the two reconstruction values A and B are decided by converting 0's and 1's in FIG. 3B to A's and B's, respectively, to form a two-tone block, while the sample mean and the sample variance for the two-tone block are the same as those of the original block shown in FIG. 2A, respectively, The two reconstruction values as well as the modified bit plane are transmitted to the decoder to reconstruct the video signal. At the decoder, a bit plane including 6×4 binary pixels is first restored from the modified bit plane. The restored bit plane will be identical with the one shown in FIG. 3B. Then, the binary pixel values are replaced by their corresponding reconstruction values to form a two-tone block. Two-tone blocks provided as described above are combined to form a frame of reconstructed video signal.

In this particular example, a 6×4 block and triangular subblocks, each including 3 binary pixels, are used. However, various sizes of blocks and shapes of subblocks may be used instead. To decide the majority value easily, it is preferable to use a subblock including an odd number of binary pixels.

Figure 4:
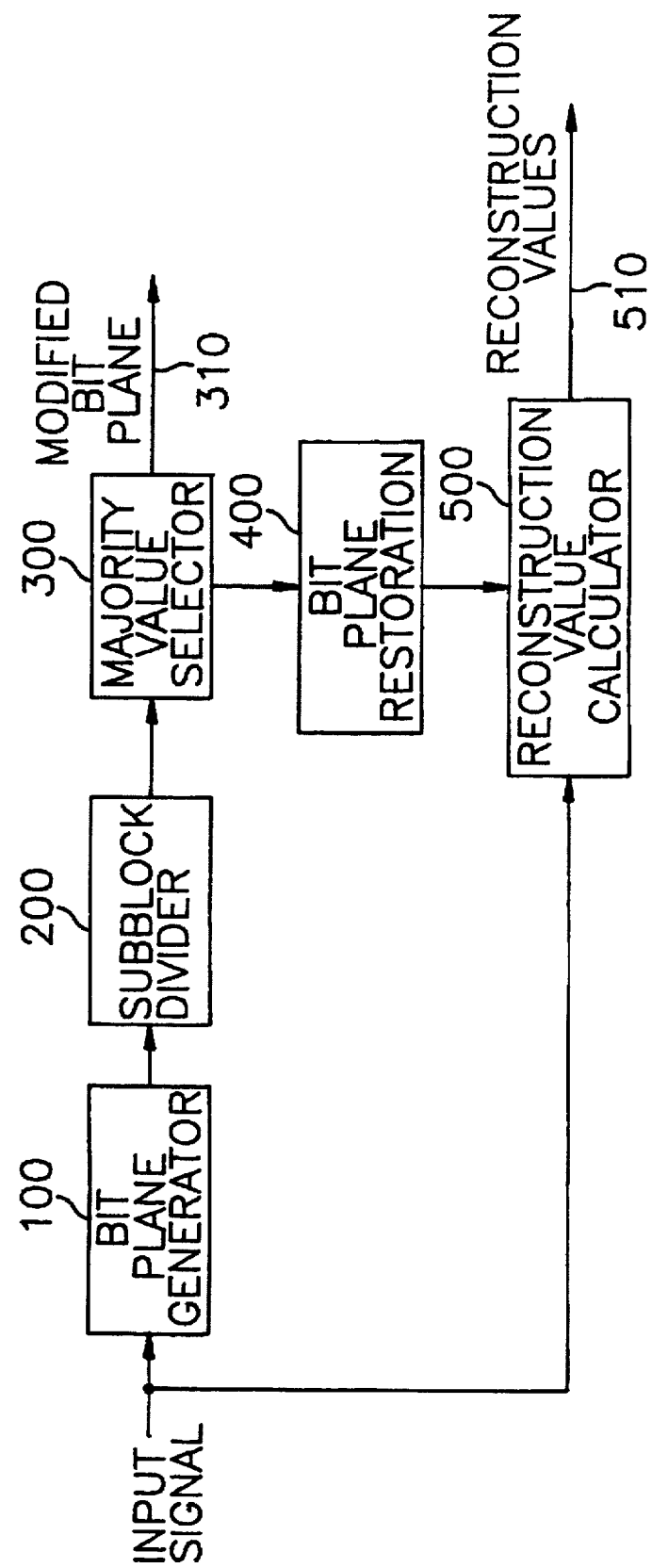
FIG. 4 provides a block diagram of an encoding device of the present invention.

Referring to FIG. 4, there is shown a block diagram of an encoding device of the present invention which includes a bit plane generator 100, a subblock divider 200, a majority value selector 300, a bit plane restoration block 400 and a reconstruction value calculator 500.

An input video signal is fed to the bit plane generator 100 wherein a frame of the video signal is divided into a multiplicity of blocks of size K×L, K and L being positive integers, e.g., 6 and 4, respectively, and each of the blocks is processed to provide a bit plane having K×L binary pixels.

Specifically, the K×L pixels included in the block are divided into a bright and a dark groups. Thereafter, a bit plane including K×L binary pixels is determined at the bit plane generator 100, a value of each binary pixel denoting either the bright or the dark group where each of the pixels in the block belongs to.

The bit plane is coupled to the subblock divider 200 wherein the bit plane is divided into a multiplicity of subblocks of a predetermined shape. Then, the subblocks of the bit plane are sequentially provided to the majority value selector 300.

At the majority value selector 300, a majority value for each of the subblocks is selected and the majority values for the subblocks contained in the bit plane are provided on a line 310 for the transmission to a decoding device corresponding to the encoding device of the present invention.

The majority values are also fed to the bit plane restoration block 400 wherein a bit plane containing K×L binary pixels is restored by filling all binary pixel values contained in a subblock with an identical value, i.e., a majority value. The restored bit plane is the same as the one shown in FIG. 3B.

The restored bit plane and the input signal are fed to the reconstruction value calculator 500. In the modified BTC method, two reconstruction values are determined assuming that the video signal is reconstructed according to the restored bit plane which is in fact different from the original bit plane determined in accordance with the conventional BTC method. Therefore, the reconstruction values are determined in accordance with the restored bit plane as stated above. Specifically, a sample mean and a sample variance of the K×L pixels included in a block of the original video signal is first determined. Then, the two reconstruction values A and B are decided so that the sample mean and the sample variance for a two-tone block obtained from the restored bit plane are the same as those of the original block of the video signal.

The two reconstruction values derived at the reconstruction value calculator 500 are provided on a line 510 which is coupled to a subsequent part of the encoding device (not shown), e.g., a transmitter for the transmission thereof.

The modified bit plane supplied from the majority value selector 300 and the two reconstruction values provided from the reconstruction value calculator 500 may be combined together and fed to the transmitter for transmission to the decoding device.

While the present invention has been described with respect to certain preferred embodiments only, other modifications and variations may be made without departing from the spirit and scope of the present invention as set forth in the following claims.

What is claimed is:

1. An apparatus for encoding a video signal to provide a coded video signal, wherein the video signal includes a plurality of frames, each of the frames is divided into a multiplicity of non-overlapping blocks and each of the blocks contains K×L pixels, K and L being positive integers, respectively, said apparatus comprising:

means for dividing K×L pixels included in each block into a bright group and a dark group based on intensity values of the pixels;

means, for said each block, for deciding a bit plane which contains K×L binary pixels, each of the binary pixels denoting either the bright or the dark group which a corresponding pixel in said each block belongs to;

means, for said each block, for dividing the bit plane into N subblocks each of which contains M binary pixels, M and N being positive integers, respectively;

means for deciding a majority value for each of the N subblocks, the majority value representing a more frequently occurring binary pixel value for said each of the N subblocks, to thereby provide a modified bit plane represented by N majority values;

means, for said each block, for providing a restored bit plane in response to the modified bit plane wherein the restored bit plane includes N restored subblocks each of which contains M restored binary pixels, said M restored binary pixels having a value corresponding to one of the N majority values;

means for determining a sample mean and a sample variance of the K×L pixels included in said each block;

means, for said each block, for determining two reconstruction values in response to the restored bit plane, the sample mean and the sample variance, wherein each of the reconstruction values denotes a representative intensity value of the pixels included in the bright or the dark group; and means, for said each block, for combining the two reconstruction values and the modified bit plane, to thereby provide the coded video signal;

wherein the two reconstruction values are determined such that when the 0 and 1 values of the binary pixels in the restored bit plane are converted to each of the reconstruction values, respectively, to form a two-tone block, a sample mean and a sample variance for the two-tone block are the same as those of said each block, respectively.

2. The apparatus of claim 1, wherein M is an odd number.

3. The apparatus of claim 1, wherein M×N is identical to K×L.

4. The apparatus of claim 1, wherein K, L and M is 6, 4 and 3, respectively.

5. The apparatus of claim 1, wherein each of the subblocks is of a triangular shape.

6. A method for encoding a video signal, wherein the video signal includes a plurality of frames, each of the frames is divided into a multiplicity of non-overlapping blocks and each of the blocks contains K×L pixels, K and L being positive integers, which comprises the steps of:

(a) dividing K×L pixels included in a block into a bright group and a dark group based on intensity values of the pixels;

(b) deciding a bit plane which contains K×L binary pixels, each of the binary pixels denoting either the bright or the dark group which a corresponding pixel in the block belongs to;

(c) dividing the bit plane into N subblocks each of which contains M binary pixels, M and N being positive integers;

(d) deciding a majority value for each of the N subblocks, the majority value representing a more frequently occurring binary pixel value for said each of the N subblocks, to thereby provide a modified bit plane represented by N majority values;

(e) providing a restored bit plane in response to the modified bit plane wherein the restored bit plane includes N restored subblocks each of which contains M restored binary pixels, said M restored binary pixels having a value corresponding to one of the N majority values;

(f) determining a sample mean and a sample variance of the K×L pixels included in the block;

(g) determining two reconstruction values in response to the restored bit plane, the sample mean and the sample variance, wherein each of the reconstruction values denotes a representative intensity value of the pixels included in the bright or the dark group;

(h) combining the two reconstruction values and the modified bit plane, to thereby provide a coded video signal for the block; and (i) repeating steps (a) to (h) for a next block of the video signal, wherein the two reconstruction values are determined such that when the 0 and 1 values of the binary pixels in the restored bit plane are converted to each of the reconstruction values, respectively, to form a two-tone block, a sample mean and a sample variance for the two-tone block are the same as those of said each block, respectively.

7. The method of claim 6, wherein M is an odd number.

8. The method of claim 6, wherein M×N is identical to K×L.

9. The method of claim 6, wherein K, L and M is 6, 4 and 3, respectively.

10. The method of claim 6, wherein each of the subblocks has a triangular shape.

11. An apparatus for encoding a frame of a video signal, wherein the frame is divided into a plurality of blocks and each of the blocks contains K×L pixels, K and L being positive integers, respectively, the apparatus comprising:

means for calculating a sample mean and a sample variance of intensity values of the pixels included in each block;

means for comparing the intensity values of the pixels in each block with a threshold;

means for assigning one of a first and a second binary numbers to each of the pixels to thereby provide, for each block, a binary bit plane containing K×L pixels each of which is represented by a binary number, wherein the first binary number is assigned to a pixel having an intensity value greater than or equal to the threshold and the second binary number is assigned to a pixel having an intensity value smaller than the threshold;

means for dividing the binary bit plane into N subblocks, each subblock containing M pixels with N and M being positive integers, respectively;

means for finding a majority binary number among M pixels within each subblock to thereby provide, for said each block, a modified bit plane represented by N majority binary numbers;

means for allocating the majority binary number of said each subblock to each of the M pixels included therein to thereby generate a restored bit plane for said each block, the restored bit plane including N restored subblocks, each of which having M pixels of an identical binary number;

means, for said each block, for determining a first and a second reconstruction values based on the restored bit plane, the sample mean and the sample variance, wherein the first and the second reconstruction values denote representative intensity values for the pixels represented by the first and the second binary numbers within the restored bit plane; and means for providing the reconstruction values and the modified bit plane as a coded video signal of said each block, wherein the two reconstruction values are determined such that when the first and the second binary numbers in the restored bit plane are converted to the first and the second reconstruction values, respectively, to form a two-tone block, a sample mean and a sample variance for the two-tone block are the same as those of said each block, respectively.

12. The apparatus of claim 11, wherein M is an odd number.

13. The apparatus of claim 11, wherein N×M is identical to K×L.

14. The apparatus of claim 11, wherein said threshold is the sample mean.

15. The apparatus of claim 11, wherein each of subblocks has a triangular shape.

16. The method for data compression of a block of data comprising K×L pixels, each pixel having a non-binary value and K and L being positive integers, said method comprising the steps of:

assigning a binary value to each pixel of the K×L pixels based upon its initial non-binary value, thus forming a first K×L bit plane;

dividing said first K×L bit plane into N subblocks each having M binary pixels, M and N being positive integers;

forming a modified bit plane having N pixels, each pixel corresponding to one of said N subblocks, a value of each of the N pixels in the modified bit plan being determined by the number of binary 1's in its corresponding subblock;

forming a K×L restored bit plane comprising N subblocks each having M pixels, each of said N subblocks in the restored bit plane corresponding to one of said N pixels in said modified bit plane, each of said M pixels in said restored bit plane having identical binary values determined by a value of the corresponding pixel in the modified bit plane; and calculating two reconstruction values based on the restored bit plane, and a sample mean and a sample variance of the K×L pixels in the original block such that when the binary values in the restored bit plane are replaced by corresponding reconstruction values to form a two-tone block, a sample mean and a sample variance of the two tone block are the same as a sample mean and a sample variance of the original block, wherein each of the reconstruction values denotes a representative intensity value of pixels in the restored bit plane, and said modified bit plane and said two reconstruction values form the compressed data.

* * * * *